United States Patent [19]

Cason, III

[11] 4,018,535
[45] Apr. 19, 1977

[54] DEVICE FOR MEASURING ENERGY TRANSFER RATES DURING LASING

[75] Inventor: Charles M. Cason, III, Huntsville, Ala.

[73] Assignee: The United States of America as represented by the Secretary of the Army, Washington, D.C.

[22] Filed: Oct. 28, 1975

[21] Appl. No.: 626,584

[52] U.S. Cl. .......................... 356/218; 331/94.5 R
[51] Int. Cl.² ........................ G01J 1/42; H01S 3/00
[58] Field of Search .................. 356/218; 331/94.5

[56] References Cited

UNITED STATES PATENTS 3,793,579  2/1974  Cason et al. ................... 331/94.52

OTHER PUBLICATIONS

Waksberg et al., "Optical Resonator Effects on the Population Distribution in He–Ne Gas Lasers Determined From Side Light Measurements", App. Phys. Letters, vol. 6, No. 7, Apr. 1965, pp. 137–138.

Primary Examiner—John K. Corbin
Assistant Examiner—Stewart Levy
Attorney, Agent, or Firm—Nathan Edelberg; Robert P. Gibson; Freddie M. Bush

[57] ABSTRACT

This device is used to measure effective energy transfer rates for a laser during lasing. It accounts for contributions to the total energy transfer rate from all component sources since measurement occurs during lasing action. An intracavity modulator operating within the optical cavity of a laser periodically interrupts lasing. The laser output is coupled to a fast response detector. The detector output is coupled to a waveform signal averager which removes random noise from the waveform. The signal is averaged to produce a clean accurate picture of the detector output which is then coupled to an x-y plotter. The x-y plotter provides a graph of signal level versus time of the output signal and provides the exponential tail from which the total energy transfer rate is obtained. Data from the x-y plotter is then replotted as a semi-log plot and the slope of this semi-log plot gives the time constant which is the total energy transfer rate.

4 Claims, 3 Drawing Figures

DEVICE FOR MEASURING ENERGY TRANSFER RATES DURING LASING

DEDICATORY CLAUSE

The invention described herein may be manufactured, used, and licensed by or for the Government for governmental purposes without the payment to me of any royalties thereon.

BACKGROUND OF THE INVENTION

There are various techniques for studying the processes taking place within the discharge tube of gas lasers which have been reported in prior art literature. Typical of prior art teachings is an article by C.B. Moore et al entitled "Vibrational Energy Transfer in $CO_2$ Laser," J. Chemical Physics 46, pages 4222–4231, June 1967; and "Survey of Vibrational Relaxation Data for Processes Important in the $CO_2$—$N_2$ Laser System," by R.L. Taylor et al, Reviews of Modern Physics, Vol. 41, No. 1, January 1969, pages 26–47 with particular attention to FIG. 11. However, there is no way to measure the energy transfer rate from excited "pump" molecules to lasing molecules during lasing. Measurements in the past have required that the gas be nonlasing. Energy transfer rates from $N_2$ (V = 1) level to $CO_2$ (00°0) level to excite the $CO_2$ (00°1) has been studied in the prior art by nonlasing and by postlasing experimentation. These prior art results for the energy transfer rate coefficient for these two levels, $k_{22}$, disclose the rates before or after lasing with no electrons or lasing photon flux present to interact with the energy transfer process. Further evidence of the coupling of the electric field with the laser photon flux is the known sudden change in the electrical conductivity of the gas when the gain spoiling device is suddenly removed. The transfer process is collisional and therefore is temperature and density dependent. During nonlasing $k_{22}$ has a component due to the filling and decay of the $CO_2$ (00°1) level population. The presence of electrons normally found in a gas discharge will also affect the results of $k_{22}$, whether lasing or nonlasing.

SUMMARY OF THE INVENTION

The apparatus of the present invention is a device for measuring energy transfer rates during lasing action. A fast response time detector which is considerably faster than the rate to be measured is coupled to receive optical output energy from the laser. An electrical output signal from this detector is coupled to a waveform signal averager wherein random noise is removed from the waveform and the signal is averaged to produce a clean accurate picture of the detector output, symbolic of the optical energy received thereby. This electrical signal is coupled to an x-y plotter where it is recorded as a function of time to obtain the exponential tail of the output pulse from which the total energy transfer rate is obtained. The data is then replotted as a semilog plot with the slope of the semi-log plot providing the time constant.

The device for measuring energy transfer rates allows an accurate energy transfer coefficient, $k_{22}$, to be determined during lasing. The dependence of the coefficient upon collision partners for a lasing system in the presence of excitating electrons and intense laser radiation is also readily obtained by measuring the coefficient for selected compositions. Thus, this apparatus provides a method of obtaining the coefficient during lasing in a glow discharge with electrons for different gas mixture ratios and densities.

DESCRIPTION OF THE PREFERRED EMBODIMENT

Figure 1:
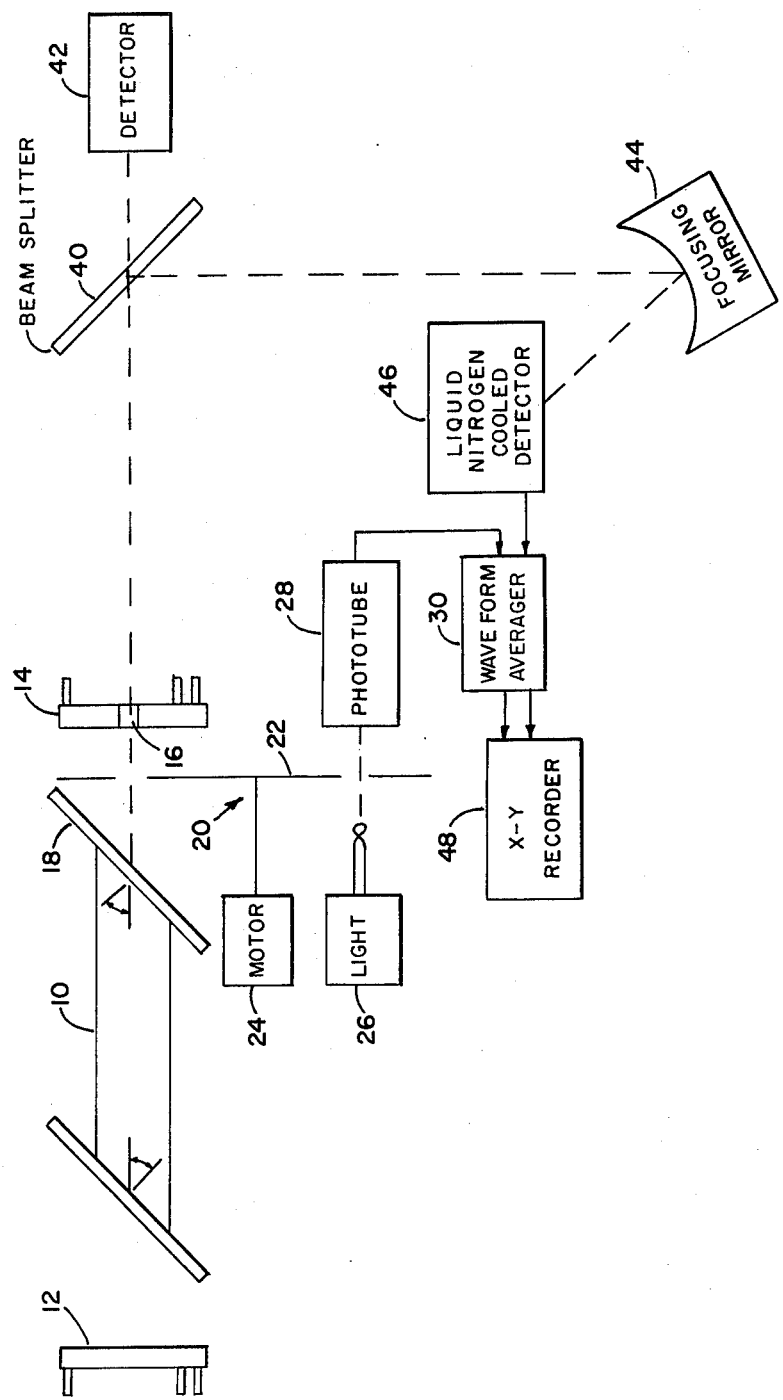
FIG. 1 is a circuit diagram of the laser system for measuring energy transfer rates during lasing with extraneous laser auxillary equipment omitted.

In determining energy transfer rates during lasing of a gas laser, the output power from a typical laser model is measured and averaged with respect to time or frequency of modulation of the output signal. The energy transfer rate coefficient, $k_{22}$, of a gas laser is directly affected by or has a component therein due to the filling and decay of the $CO_2$ level population. The transfer process is collisional and therefore is temperature and density dependent. Electrons which are normally found in a gas discharge may affect the value of this coefficient. The laser photon flux, which is only present during lasing, may also affect the value of $k_{22}$. In a $CO_2$–$N_2$ gas laser system, when the gas is lasing, molecules in the $CO_2$ (00°1) level are depopulated and stimulated to populate the $CO_2$ (10°0) level. Therefore during lasing the kinetics of the $CO_2$ (10°0) level population influences the energy transfer rate coefficient $k_{22}$, in a different way from the kinetics of the molecules in the $CO_2$(00°1) level when the gas is not lasing. Thus, the dependence of $k_{22}$ upon gas density for a lasing system in the presence of excitating electrons can be determined by measuring the energy transfer rate coefficient during lasing.

Referring now to the drawings wherein there is disclosed a preferred embodiment of the present invention, a laser device 10 is coaxially disposed between adjustable mirrors 12 and 14 to provide an optical cavity. Output mirror 14 has a hole 16 in its center for coupling out laser energy. A chopper wheel assembly 20 is located adjacent the output end of the laser within the laser optical cavity such that the output window 18 of tube 10 and mirror 14. Chopper wheel 22 is rotated by a synchronous motor 24. A light source 26 is positioned diametrically opposite the laser beam with respect to wheel 22 so that wheel 22 will interrupt a light beam therefrom simultaneously with the interruption of the output laser beam. A phototube 28 is aligned with light source 26 and responds to the interrupted beam therefrom to provide an output timing signal. The electrical output of phototube 28 is coupled to a waveform averager 30 to provide a timing signal. Output optical energy from the laser is coupled through output mirror 14 to a beam splitter 40. A portion of the energy impinging on beam splitter 40 is coupled through the beam splitter to a slow wave detector 42 which produces a calibrated signal proportional to the time average output laser power. The remainder of the optical energy is reflected from beam splitter 40 to a focusing mirror 44 which directs the optical energy to a liquid nitrogen cooled detector 46. Detector 46 is a very high speed detector having a response time faster than the operating cycle of the laser system. An electrical output of detector 46 is coupled to waveform signal averager 30 which removes random noise from the waveform and averages the signal to produce a clean accurate picture of the detector output. The waveform averager has an electrical signal output indicative of the laser output energy and a time output coupled to an x-y recorder 48 for recording the changes in the average laser output waveform with respect to time. The averager 30 may be a Waveform Eductor, a waveform averager produced by the Princeton Applied Research Corporation which provides pulse signal averaging.

In operation, the chopper wheel 22 operating within the optical cavity of laser 10 periodically interrupts the optical cavity and the light from light source 26 at an established frequency. The output beam from laser 10 is monitored by the slow response time detector 42. Beam splitter 40 redirects a small fraction of the laser output signal toward focusing mirror 44 which is adjusted to direct the signal to detector 46. The output signal is then converted to an electrical signal and coupled to the averager 30 or Waveform Eductor wherein individual waveforms are averaged and the averge waveform subsequently recorded on the x-y recorder 48 to obtain the time averaged output signals shown in FIG. 2.

Figure 2:
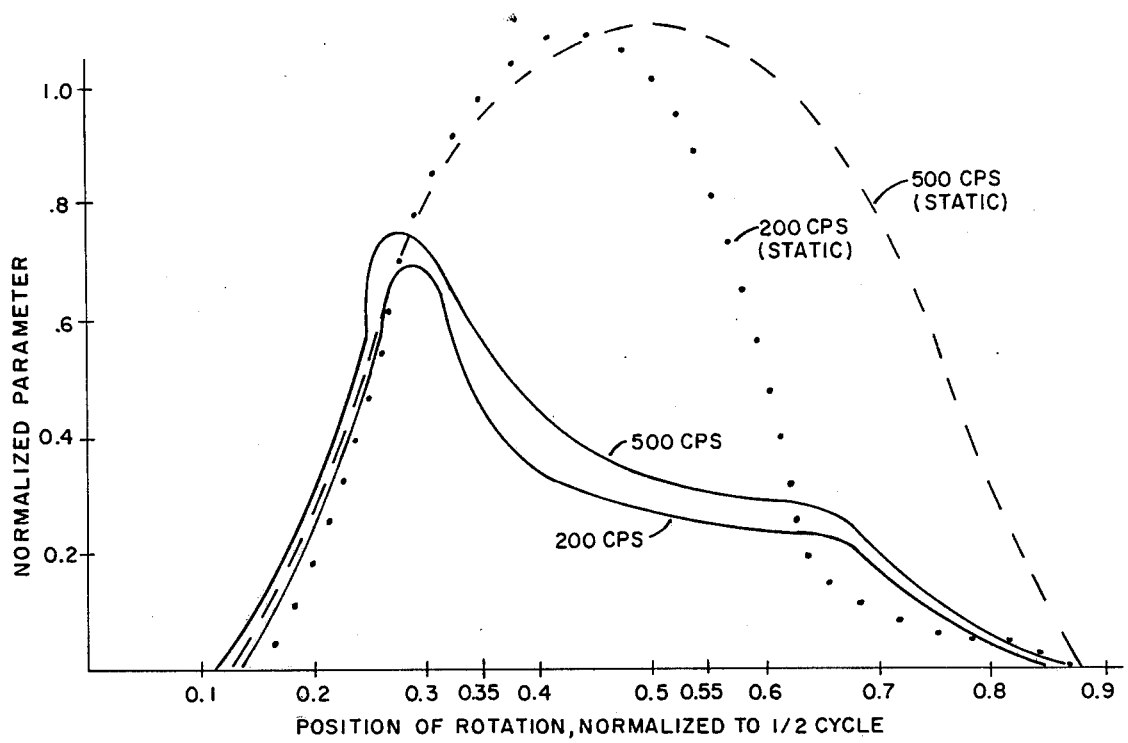
FIG. 2 is a graph of the static and dynamic output power from the laser of FIG. 1.

FIG. 2 discloses the output of the laser normalized to one-half cycle of chopper wheel rotation. Thus for a chopper wheel rotation of 200 cycles per second a single output pulse is shown beginning when the laser output hole is opened by the chopper wheel blade edge and ending when the next blade covers the output opening. A similar curve is shown for 500 cycles per second of chopper wheel blade rotation. For comparison, measurements of normalized static outputs of the laser as a function of blade position of rotation are also shown for these two frequencies.

Figure 3:
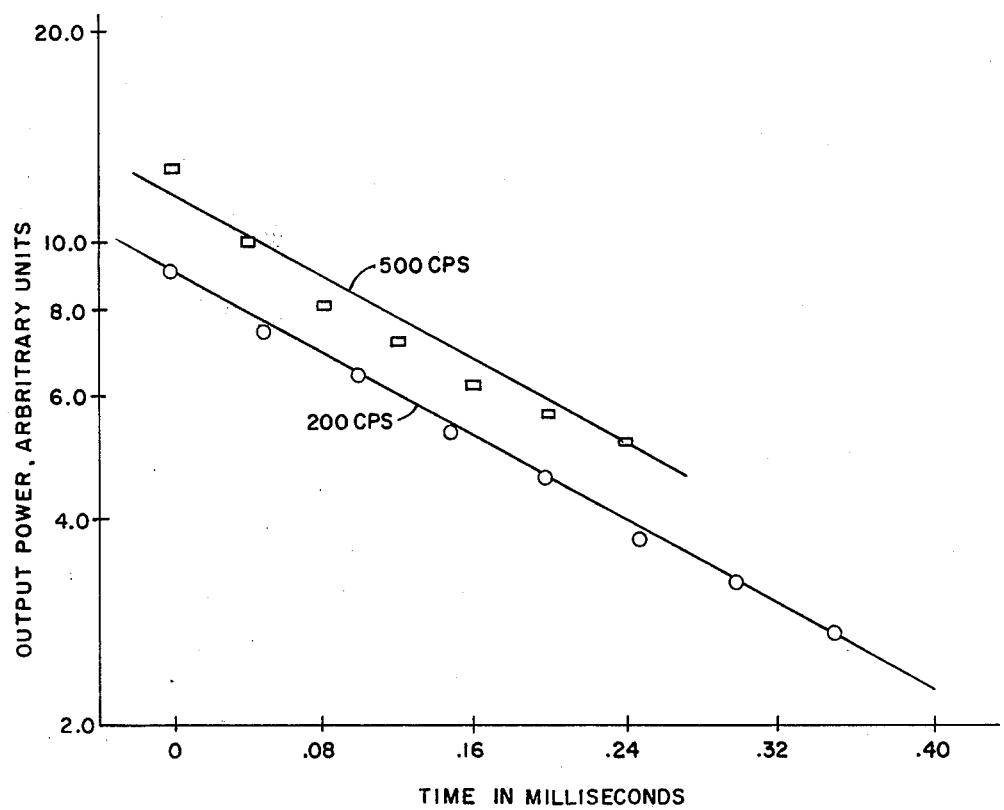
FIG. 3 is a semi-log plot of the output power obtained from FIG. 2.

FIG. 3 is a semi-log plot of the exponential tail segments between 0.35 and 0.55 of the normalized rotary position of FIG. 2 since this portion of the period is dominated by stable state lasing action because the chopper wheel is completely clear of the optical aperature. These segments were plotted as a function of real time. The observed decay in the laser output signal is due to the decay of the transfer of energy to the $CO_2$ (00°1) level by the population of the $N_2$ (V = 1) level and any active CO level, less any energy exchanged due to electrons transferring energy into the $CO_2$ (00°1) level. During lasing the $N_2$ (V = 1) population dominates. An analysis of the slopes in FIG. 3 disclose the value of the relaxation time constant. It is seen from the figure that the slope time constant is $1/97 = 3.5 \times 10^3$/seconds. It is known that for most $CO_2$ lasers the temperature of $N_2$ (V = 1) is about 2,000 degrees Kelvin. The rate constant, $k_{22}$, is determined by $$k_{22} = \frac{1}{N_2 (V=1) Y}$$

where Y is the time constant for the energy transfer. Numerically the experimental value for $$k_{22} = \frac{3.5 \times 10^3/\text{sec}}{(1.52 \times 10^{16} \text{ molecules/cm}^3)}$$

which is equal to $2.3 \times 10^{-13}$ molecules/cm$^3$ seconds for this data.

Prior art methods have employed shock tubes, spectraphones and laser fluorescence methods to determine energy transfer rate data. None of these prior art methods are performed on an optically active medium that is undergoing stimulated emission. Data obtained by these prior art methods which do not account for the radiation field coupling effects, will introduce uncertainty in theoretical models where this coupling is significant. The apparatus for measuring energy transfer rates during lasing provides energy transfer rate data for an optical medium undergoing stimulated emission. This properly accounts for the interaction of the electric fields of the laser radiation with the electrons in the gas and the fields of the molecules. The energy transfer rates taken by this method provides an accurate energy transfer rate coefficient for respective lasing mediums and may also be used in analysis of laser models, such as in predicting operation data of a proposed laser.

Although a particular embodiment and form of this invention have been illustrated, it will be apparent to those skilled in the art that modifications may be made without departing from the scope and spirit of the foregoing disclosure. Therefore, it is understood that the invention is limited only by the claims appended hereto.

I claim:

1. Apparatus for measuring energy transfer rates during lasing and comprising: a gas laser having output optical energy, interrupting means disposed in the path of said output energy to establish an output pulse repetition rate, pulse rate measuring means synchronous with said laser output for providing the pulse repetition rate of said laser, a liquid nitrogen cooled detector responsive to the output of said laser to provide an output pulse representative of said laser pulse energy, a pulse waveform averager responsive to said liquid nitrogen cooled detector output and said pulse rate measuring means output to provide respectively pure output signal energy pulses and synchronous time pulse outputs, and recording means responsive to said averager outputs for recording a graph of said output signal energy pulses versus the synchronous pulse repetition rate.

2. The apparatus as set forth in claim 1 wherein said pulse rate measuring means is a light source diametrically opposite said laser discharge tube and a photocell coaxially aligned with said light source and responsive thereto to provide an output signal, and said interrupting means is further disposed between said light source and said photocell for synchronizing the pulse repetition rate measuring means with the output of said laser.

3. The apparatus as set forth in claim 2 wherein said laser is a $CO_2$—$N_2$ laser having first and second mirrors at each end of the laser tube for providing an optical cavity therebetween, and said interrupting means is a motor driven chopper wheel disposed between the first of said mirrors and said laser tube for intermittently interrupting the cavity oscillation of said laser, said first mirror being the laser output mirror.

4. During lasing of a gas laser having a discharge tube provided with end reflective members forming a laser cavity therebetween and a chopper wheel intermittent said end reflective members, a method for measuring energy transfer rates comprising the steps of:
   rotating the chopper wheel at a fixed rotation rate,
   detecting laser power output waveforms during each half cycle of rotation,
   measuring the time period of output waveforms of said laser,
   recording a graph of said power output with respect to the time period in which said power output occurs, and
   averaging the detected waveform of said output laser to remove impurities from the signal before recording said graph.

* * * * *